United States Patent [19]

Osawa et al.

[11] Patent Number: 4,493,513
[45] Date of Patent: Jan. 15, 1985

[54] BEARING CAGE FOR RETAINING ROLLING ELEMENTS

[75] Inventors: Hiroyuki Osawa, Kamakura; Yasutaka Ishida, Fujisawa, both of Japan

[73] Assignee: Nippon Seiko Kabushiki Kaisha, Tokyo, Japan

[21] Appl. No.: 505,763

[22] Filed: Jun. 20, 1983

[30] Foreign Application Priority Data

Jun. 23, 1982 [JP] Japan ............................. 57-93038[U]

[51] Int. Cl.³ ........................ F16C 33/38; F16C 33/42
[52] U.S. Cl. .................................... 384/533; 384/523
[58] Field of Search ................... 308/201, 188, 189 R, 308/189 A, 190, 193

[56] References Cited

U.S. PATENT DOCUMENTS

| 2,783,104 | 2/1957 | Anderson | 308/201 |
| 3,820,867 | 6/1974 | Dickinson et al. | 308/201 |
| 4,136,915 | 1/1979 | Derner | 308/201 |
| 4,386,811 | 6/1983 | Heemskerk et al. | 308/188 |

*Primary Examiner*—Lenard A. Footland
*Attorney, Agent, or Firm*—Basile, Weintraub & Hanlon

[57] ABSTRACT

At least a part of the inner face 41 of each pocket of a cage 4 for retaining and guiding rolling elements is formed to have a curvature of similar configuration to that of the rolling element and the center of curvature of the face is positioned to radially deviate from the pitch circle of the rolling elements at a predetermined distance.

7 Claims, 6 Drawing Figures

BEARING CAGE FOR RETAINING ROLLING ELEMENTS

BACKGROUND OF THE INVENTION

1. Field of the Invention

This invention relates to a cage for rolling bearing such as ball bearings and roller bearings, and more particularly, it relates to an improvement for cages for retaining rolling elements of rolling bearings.

2. Description of the Prior Art

There are various causes of vibrations and noise in rolling bearing assemblies. However the main cause is considered to be run-out of the cage in a radial direction, with respect to the rolling elements.

Accordingly, in order to reduce such vibrations and noise can be reduced, it is necessary to make the run-out in the radial direction as small as possible. However, this is difficult to achieve with a wave-type cage. As is known to those skilled in the art to which the present invention pertains, a conventional wave-type cage for a ball bearing has an outer race and an inner race with bearing balls interposed between the two races. The bearing, also, comprises a wave-type cage including a pair of wave shaped plates. The plates are assembled by clasping their respective bottoms together to form a plurality of pockets into each of which a ball is received. The balls are spaced apart at an equal pitch in a peripheral direction.

For purposes of illustrating the extent of radial run-out, assume that the radius of curvature of the inner face of a pocket R1a and the center of curvature is positioned on a pitch circle La. Assume, also, that one half of the total axial run-out of the cage, with respect to a ball, is $\Delta t1a$ and the radius of the ball is ra. Then, there is a relation $\Delta t1a = R1a - ra$. Assuming that one half of the total run-out of the cage in the radial direction is $\Delta r1a$ and the intersecting point of the inner face of the pocket with the radial edge face of the cage is Pa, and further assuming that the line which runs from the point Pa upwardly and normal to the pitch circle intersects the ball at point Qa, then $\Delta r1a = Pa \cdot Qa$ and the value of $\Delta r1a$ becomes considerably larger than $\Delta t1a$. In other words, the amount of the run-out of the cage in the radial direction is considerably larger than that in the axial direction.

In order to restrict the radial run-out of the bearing cage, some attempts have been made heretofore, to lessen the extent of its axial movement. However, there have been several drawbacks to this. For example, dimensional errors on the inner surface of the pocket of the cage are liable to be introduced. This can come about from errors in indexing, namely, in circumferentially dividing the pockets and rivet holes; working errors in clasping the two mating regular plates together, and so on. This causes poor lubrication between the balls and the inner face of the cage pockets which results in increased frictional torque, early wear out and/or seizure.

Since some error in the circumferential direction is unavoidable in working, such as, parts making, assembly and so forth, thus the aforesaid value of $\Delta t1a$ should be selected taking such errors into account.

Moreover, since there exists a geometric relationship between the $\Delta r1a$ and the $\Delta t1a$, the $\Delta r1a$ varies as a function of the value of $\Delta t1a$ and the amount of r1a is far larger than $\Delta t1a$, any significant effect cannot be expected by reducing the $\Delta t1a$. In other words, reducing $\Delta t1a$ is almost non-effective to reduce the extent of the run-out in the radial direction.

The present invention aims to obviate the drawbacks in the cages of the conventional type as mentioned above. Accordingly, an object of the present invention is to provide a bearing cage for retaining the rolling elements having a construction which can readily lessen the run-out of the cage and the rolling elements of a rolling bearing. Another object of the present invention is to provide a bearing which can be operated with less noise and vibrations together with higher service life.

SUMMARY OF THE INVENTION

In accordance with the present invention there is provided a cage wherein at least a part of the inner face of the pockets of the cage, which guides and retains each rolling element, is formed with a curvature almost the same as that of the rolling element. The center of the curvature is positioned to be spaced apart, either radially outside or inside, from the pitch circle of the rolling elements, at a predetermined distance.

In other words, by positioning the center of the curvature of the inner face of the cage to be deviated radially outwards or inwards from the pitch circle off the rolling elements as mentioned above, as a measure for reducing the radial run-out of the cage, the radial distance between the surface of the rolling element and the point where the inner face of the cage intersects the radial inner edge or outer edge of the cage, can be reduced, regardless of the amount of the axial distance between the inner face of the cage and the surface of the rolling elements.

According to the present invention, the amount of the radial run-out of the cage can be restricted, so that it becomes possible to obtain bearing cages operable with reduced vibration an noise unaffected by manufacturing errors. In addition, the clearance between the inner face of the cage pocket and the rolling element can be widened providing better lubrication providing cages with higher wear-resistant performance. It should be noted that this invention is freely and equally applicable either to ball bearings or roller bearings.

For a more complete understanding of the present invention reference is made to the following detailed description and accompanying drawing. In the drawing like reference characters refer to like parts throughout the several views in which:

DETAILED DESCRIPTION OF THE PREFERRED EMBODIMENTS

Figure 1:
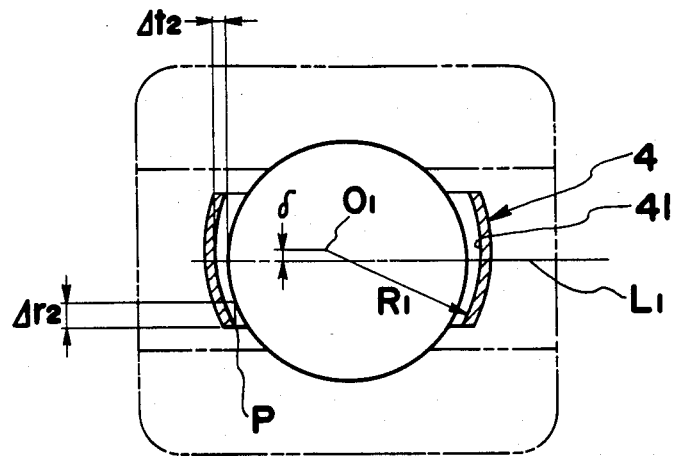
FIG. 1 is a sectional view of a first preferred embodiment of the present invention.

Referring now to the drawings and particularly FIG. 1, there is shown a first embodiment of the present invention. In the drawing, the center of the curvature of an inner face 41 of a cage 4 has a radius $R_1$ which deviates radially outward of the bearing from the pitch circle $L_1$ of the balls by a distance $\delta$. Therefore, the run-out or radial movement $\Delta r2$ of the cage 4, relative to the ball, is restricted by the radial inner rim or edge of each cage, namely, the point P. The point P corresponds to the point where the inner face of the pocket intersects the inner diameter of the cage. Consequently, the amount of run-out $\Delta r2$ can be adjusted to a desired value in the radial direction by setting the deviation $\delta$ to a suitable amount, without being affected by the amount of axial run-out $\Delta r2$ of the cage 4.

Figure 2:
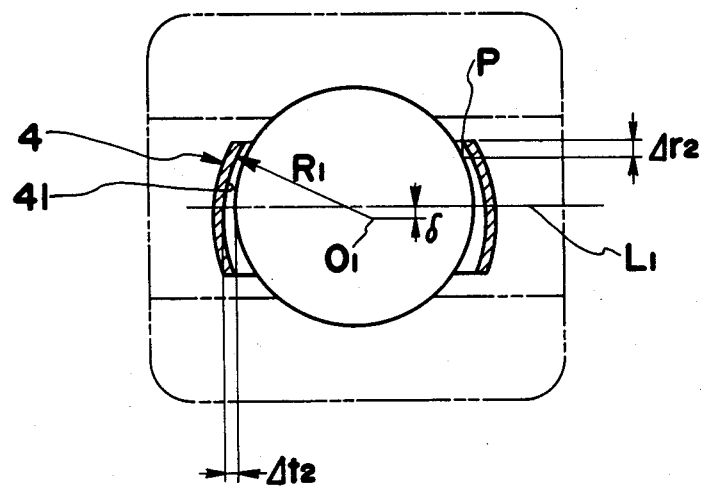
FIG. 2 is a sectional view of a second embodiment of the present invention.

In the embodiment of FIG. 2 the amount of deviation $\delta$ is set in a direction radially reverse to that in FIG. 1, with respect to the pitch circle $L_1$ of the balls. In this instance, the radial movement of run-out of the cage is restricted by the radial inner rim at the point P. The point P is where the inner face of the cage intersects the outer diameter of the cage.

Figure 3:
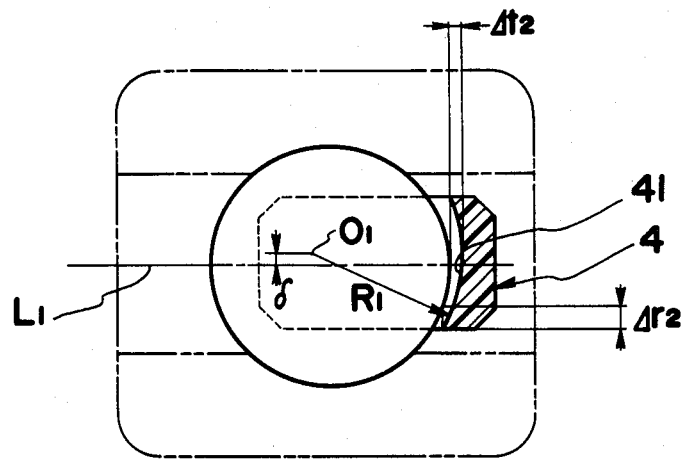
FIG. 3 is a sectional view of a third embodiment of the present invention.

FIG. 3 shows a third embodiment hereof, wherein the cage 4 is a crown-type cage. This type of cage, which is a molded cage, has the center $O_1$ of the curvature 41 of the inner face of the pocket positioned such that it is spaced apart radially outwardly from the pitch circle L1 by a deviation $\delta$. Accordingly, the amount of radial run-out $\Delta r2$ of the cage is restricted by the length of the distance from the ball to the point where the inner face of the pockets intersects the inner diameter of the cage.

Figure 4:
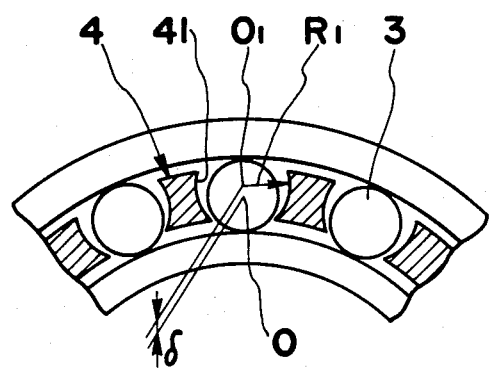
FIG. 4 is a fragmentary sectional view showing the main part of a cylindrical roller bearing in a fourth embodiment of this invention.

FIG. 4 is a fragmentary sectional side view of a cylindrical roller bearing which defines a fourth embodiment of the present invention. In this embodiment the center of curvature $O_1$ of the inner face 41 of the pocket of the cage 4 is radially and outwardly deviated from the center 0 of the roller by an amount $\delta$. Accordingly, the amount of radial run-out of the cage is restricted by the length of radial distance between the outer diameter of the roller and the point where the inner face of the pocket and the inner diameter of the cage intersects.

Figure 5:
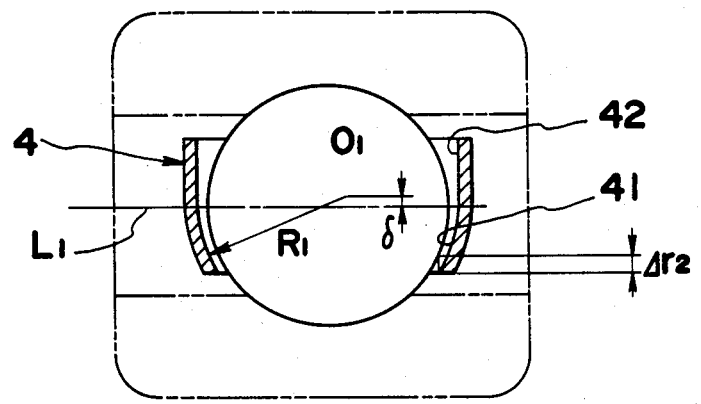
FIG. 5 is a sectional view of a fifth embodiment of this invention.
Figure 6:
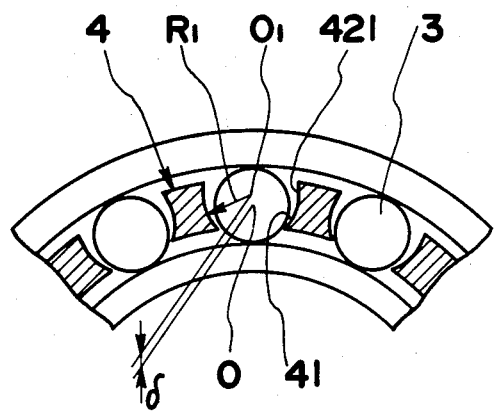
FIG. 6 is a sectional view of a sixth embodiment of the present invention.

Although in the embodiments mentioned above, the entirety of the inner face of the pocket is formed as a curved surface, in the fifth and sixth embodiments shown in FIGS. 5 and 6, respectively, it is formed in a different manner.

In the fifth embodiment hereof, there is a ball bearing assembly in which a portion of each pocket, at the outer diameter side, opposite to the inner diameter side which restricts the run-out of the cage, is formed into a circular cylindrical inner surface 42 normal to the axis of the rotation. Similarly, in the roller bearing shown in FIG. 6, the portion at the outer diameter side, opposite to the inner diameter side which restricts the run-out, is formed into a straight cylindrical inner face 421 normal to the axis. According to the embodiments of FIGS. 5 and 6, the flow of lubricants, such as grease, into the pocket becomes more uniform as compared with four other embodiments.

There can be several other modifications of the present invention. For example, a cage having an inner face comprising a spherical portion and a cylindrical portion being contiguous with each other and positioned in a manner radially opposite to those shown in the other embodiments.

Having, thus, described the invention, what is claimed is:

1. In a cage for retaining rolling elements of a rolling bearing, of the type wherein the cage has at least one pocket formed therein for retaining a rolling element, the improvement which comprises: at least a part of the inner face of each pocket has a curved surface of substantially similar configuration to the curved surface of the rolling element and the center of the curvature of the curved surface is positioned to deviate radially from the pitch circle of the rolling element at a predetermined distance.

2. The improvement as claimed in claim 1, wherein the center of the curvature of the inner face of the pocket of the cage is deviated radially and outwardly from the pitch circle of the rolling element at a predetermined distance.

3. The improvement as claimed in claim 1, wherein the center of the curvature of the inner face of the pocket of the cage is deviated radially and inwardly from the pitch circle of the rolling element at a predetermined distance.

4. The improvement as claimed in claim 1, wherein the cage is a crown-type cage and the center of curvature of the inner face of the pocket of the cage deviates radially and inwardly from the pitch circle of the rolling element at a predetermined distance.

5. The improvement as claimed in claim 1, wherein the rolling element is a cylindrical roller, the cage retains the roller, and the center of curvature of the inner face of the pocket of the cage deviates radially and outwardly from the pitch circle of the rolling element at a predetermined distance.

6. The improvement as claimed in claim 1, wherein the rolling element is a cylindrical roller, the cage retains the roller, the inner face of the pocket of the cage, at a radially outer portion thereof forms a straight cylindrical wall, while the inner face of the pocket, at the radially inner portion thereof forms a surface contiguous to the cylindrical wall, and the center of curvature of the curved surface deviates radially and outwardly from the pitch circle of the rolling element at a predetermined distance.

7. The improvement as claimed in claim 1, wherein the rolling elements is a bearing ball, the cage retains ball, the inner face of the cage, at a radially outer portion thereof, forms a straight cylindrical wall, while the inner face of the cage, at the radially inner portion thereof forms a curved surface contiguous to the cylindrical wall, and the center of curvature of the curved surface deviates radially and inwardly from the pitch circle of the rolling element at a predetermined distance.

* * * * *